US008659572B2

(12) United States Patent
Zhai

(10) Patent No.: US 8,659,572 B2
(45) Date of Patent: *Feb. 25, 2014

(54) SMART TOUCHSCREEN KEY ACTIVATION DETECTION

(71) Applicant: Google, Inc., Mountain View, CA (US)

(72) Inventor: Shumin Zhai, Los Altos, CA (US)

(73) Assignee: Google Inc., Moutain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,910

(22) Filed: Apr. 5, 2013

(65) Prior Publication Data

US 2013/0222315 A1    Aug. 29, 2013

Related U.S. Application Data

(63) Continuation of application No. 13/360,242, filed on Jan. 27, 2012, now Pat. No. 8,436,828.

(51) Int. Cl.
*G06F 3/041* (2006.01)

(52) U.S. Cl.
USPC .......................................................... 345/173

(58) Field of Classification Search
USPC ...................... 345/156–173; 340/5.8–5.83; 382/115–116, 124–127; 434/227–233; 713/186–202; 178/18.01–18.11
See application file for complete search history.

(56) References Cited

U.S. PATENT DOCUMENTS

| | | | |
|---|---|---|---|
| 4,891,786 A | 1/1990 | Goldwasser | |
| 5,917,476 A | 6/1999 | Czerniecki | |
| 6,286,064 B1 | 9/2001 | King et al. | |
| 6,323,846 B1 | 11/2001 | Westerman et al. | |
| 7,020,270 B1 | 3/2006 | Ghassabian | |
| 7,075,520 B2 | 7/2006 | Williams | |
| 7,098,896 B2 | 8/2006 | Kushler et al. | |
| 7,280,677 B2 | 10/2007 | Chandler et al. | |
| 7,420,546 B2 | 9/2008 | Abdallah et al. | |
| 7,453,439 B1 | 11/2008 | Kushler et al. | |
| 7,479,949 B2 | 1/2009 | Jobs et al. | |
| 7,561,146 B1 | 7/2009 | Hotelling | |
| 7,750,891 B2 | 7/2010 | Stephanick et al. | |
| 8,165,997 B1 | 4/2012 | Podgorny et al. | |
| 8,436,828 B1 * | 5/2013 | Zhai .............................. | 345/173 |
| 2003/0048260 A1 | 3/2003 | Matusis | |
| 2003/0067495 A1 | 4/2003 | Pu et al. | |
| 2005/0225538 A1 | 10/2005 | Verhaegh | |
| 2006/0190836 A1 | 8/2006 | Ling Su et al. | |
| 2007/0097096 A1 | 5/2007 | Rosenberg | |
| 2008/0141293 A1 | 6/2008 | Blanchard et al. | |
| 2008/0165255 A1 | 7/2008 | Christie et al. | |
| 2009/0037742 A1 | 2/2009 | Narayanaswami | |
| 2009/0237361 A1 | 9/2009 | Mosby et al. | |
| 2009/0244092 A1 | 10/2009 | Hotelling | |

(Continued)

OTHER PUBLICATIONS

U.S. Appl. No. 13/360,242, by Shumin Zhai, filed Jan. 27, 2012.

(Continued)

*Primary Examiner* — Rodney Amadiz
(74) *Attorney, Agent, or Firm* — Shumaker & Sieffert, P.A.

(57) ABSTRACT

Embodiments relate to systems for, and methods of, detecting attempted space key activations on a touchscreen. Such systems and methods allow for error-tolerant data input on a touchscreen. The systems and methods may be adaptive and grow progressively more accurate as additional user data is received.

20 Claims, 4 Drawing Sheets

(56) References Cited

U.S. PATENT DOCUMENTS

| | | |
|---|---|---|
| 2010/0177121 A1 | 7/2010 | Homma et al. |
| 2010/0182125 A1 | 7/2010 | Abdallah et al. |
| 2010/0225443 A1 | 9/2010 | Bayram et al. |
| 2010/0240415 A1 | 9/2010 | Kim et al. |
| 2010/0289752 A1 | 11/2010 | Birkler |
| 2010/0289754 A1 | 11/2010 | Sleeman et al. |
| 2011/0025626 A1 | 2/2011 | Inami |
| 2011/0084857 A1 | 4/2011 | Marino et al. |
| 2011/0102351 A1 | 5/2011 | Seo |
| 2011/0221684 A1 | 9/2011 | Rydenhag |
| 2012/0032979 A1 | 2/2012 | Blow et al. |
| 2012/0083311 A1 | 4/2012 | Salter et al. |
| 2012/0086647 A1 | 4/2012 | Birkler |

OTHER PUBLICATIONS

Non-Final Office Action from U.S. Appl. No. 13/360,242, dated May 10, 2012, 14 pp.

Response to Non-Final Office Action dated May 10, 2012, from U.S. Appl. No. 13/360,242, filed Jul. 25, 2012, 6 pp.

Final Office Action from U.S. Appl. No. 13/360,242, dated Oct. 22, 2012, 15 pp.

Response to Final Office Action dated Oct. 22, 2012, from U.S. Appl. No. 13/360,242, filed Dec. 17, 2012, 8 pp.

Notice of Allowance from U.S. Appl. No. 13/360,242, dated Jan. 7, 2013, 10 pp.

International Search Report and Written Opinion of international application No. PCT/US2013/023249, dated May 7, 2013, 14 pp.

* cited by examiner

SMART TOUCHSCREEN KEY ACTIVATION DETECTION

PRIORITY

This is a continuation of U.S. application Ser. No. 13/360,242, filed on Jan. 27, 2012, entitled "Smart Touchscreen Key Activation Detection," assigned to the corporate assignee of the present invention and incorporated herein by reference.

SUMMARY

According to various embodiments, a computer implemented method of detecting an activation of a virtual key is disclosed. The method may include determining, by a computing device, a location of a thumb contact detected at a touchscreen of the computing device, determining, by the computing device, a size of an area of the thumb contact, and determining an orientation of the thumb contact. The method may further include comparing the size of the area, the orientation, and the location to data associated with previous thumb and finger contact detected at the touchscreen. The method may further include determining, based on the comparing, that the thumb contact constitutes an intended activation of a given virtual key, and outputting, in response to the determining, an electronic representation of a character associated with the given virtual key.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
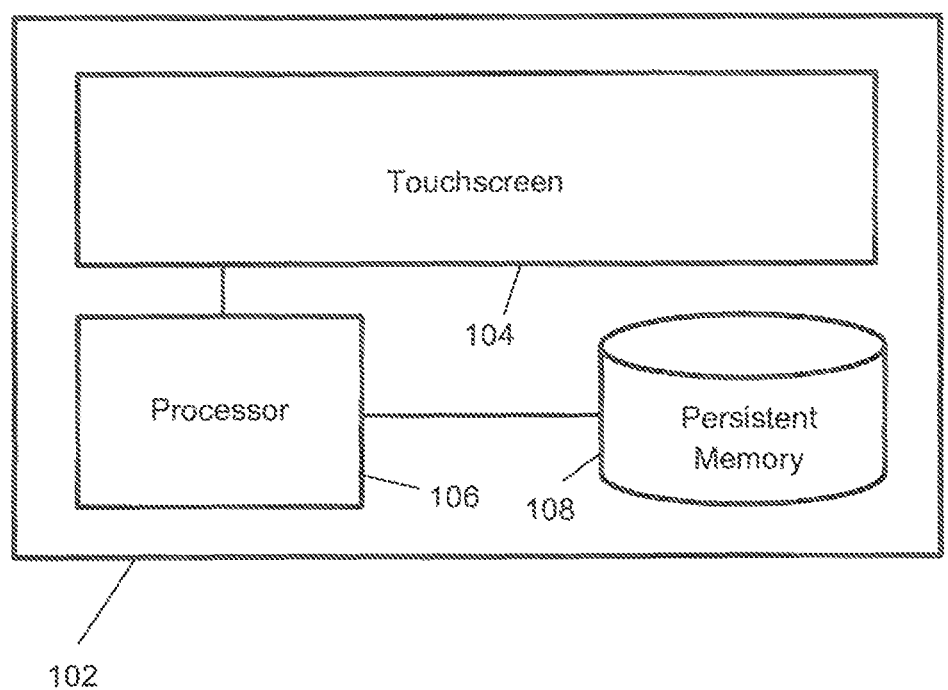
FIG. 1 is a schematic diagram of an apparatus according to various embodiments.

Devices that employ touchscreens may use the space key as, for example, an enter or confirmation button to activate predicative word completion. Accordingly, such touchscreen devices tend to depend on absolute accuracy in space key activations (even if such demands are not made of the other keys). However, a need for absolute accuracy driven by predicative word completion makes it difficult to correctly interpret space key activation attempts that miss the area of the touchscreen designated as the space key. Accordingly, there is a need for smart space key activation detection for touchscreen devices.

Embodiments are not limited to space key activation attempt detection. In general, devices that employ touchscreens are amenable to using disclosed embodiments to detect activation attempts of any particular key, where one or both of the following obtain: the particular key is typically activated by a particular digit or portion of the hand, and the particular key is located in a particular region of the touchscreen. An exemplary such key, as discussed above, is the space key. As another example, users may activate the enter key using a knuckle or other portion of a hand, and the enter key is located at a particular region of the touchscreen. Accordingly, the enter key is amenable to the techniques disclosed herein. Embodiments disclosed herein are not limited to space keys and enter keys.

Various embodiments directed to space key activation detection track a thumb signal for each possible space key activation. The thumb signal is intended to differentiate between thumb touches and touches by fingers, as thumb touches tend to correspond to space key activations. (Note that throughout this disclosure, the word "finger" refers only to non-thumb hand digits.) The thumb signal may include any, or a combination, of three components: a touch area size, a touch area orientation, and a touch area texture. Touch area size measures the size of the area of contact between the touchscreen and digit, which tends to be larger for thumbs than for fingers. Touch area orientation accounts for the fact that thumb touches tend to be oblong in the shape of the contact area, whereas touches by other digits tend to be more circular. Touch area texture measures qualities such as ridges and joins splits, which are distinct between thumbs and fingers.

Various embodiments directed to detecting space key activation attempts may in addition, or in the alternative, track a location signal for each possible space key activation. The location signal is intended to exploit the fact that statistically significant lower contacts (that is, low on the part of the touchscreen designated as a keyboard) near in time to higher contacts tend to be attempted space key activations.

Various embodiments directed to detecting space key activation attempts use either or both of the thumb signal and the location signal to determine whether a possible space key activation should be considered an actual space key activation attempt. Such embodiments may use adaptive learning techniques to compare one or both of the thumb signal and the location signal of a possible space key activation to such signals from past actions. Thus, such embodiments use adaptive learning to differentiate between space key and other key activation attempts.

Reference will now be made in detail to exemplary embodiments of the present teachings, which are illustrated in the accompanying drawings. Where possible the same reference numbers will be used throughout the drawings to refer to the same or like parts.

FIG. 1 is a schematic diagram of an apparatus according to various embodiments. Apparatus 102 may be any computing device, such as, by way of non-limiting example, a smart phone, a personal digital assistant (PDA) or a tablet computer. Apparatus 102 may be portable or a fixture. In FIG. 1, apparatus 102 includes or is communicatively coupled to touchscreen 104. Touchscreen 104 may be positioned in a manner such that a user of device 102 can physically interact with touchscreen 104.

Touchscreen 104 may implement any of a variety of technologies. By way of non-limiting example, touchscreen 104 may be any of the following types: resistive, surface acoustic wave, capacitive (e.g., surface capacitance, projected capacitance, mutual capacitance or self-capacitance), infrared, optical imaging, dispersive signal technology or acoustic pulse recognition. In FIG. 1, touchscreen 104 is communicatively coupled to processor 106. Processor 106 may be, by way of non-limiting example, a microprocessor or a microcontroller. In FIG. 1, Processor 106 is capable of carrying out electronically stored program instructions and is communicatively coupled to persistent memory 108. Persistent memory 108 may include, by way of non-limiting example, a hard drive or a flash memory device.

Figure 2:
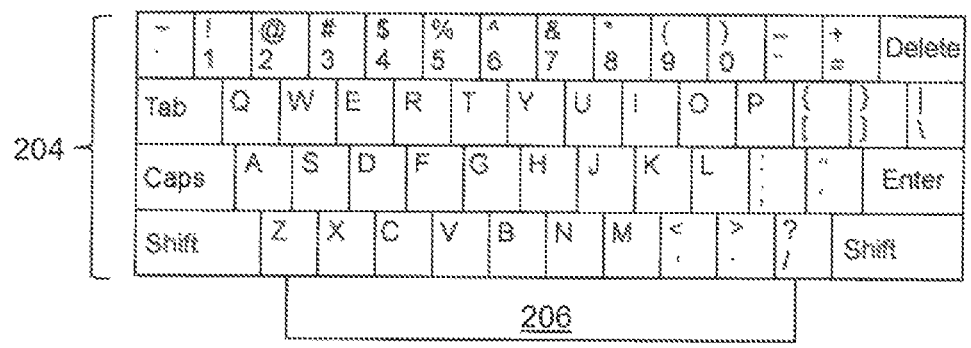
FIG. 2 is a schematic diagram of a touchscreen keyboard layout according to various embodiments.

FIG. 2 is a schematic diagram of a touchscreen keyboard layout 202 according to various embodiments. In particular, FIG. 2 depicts a QWERTY keyboard layout, although embodiments are not so limited (e.g., embodiments may include a DVORAK keyboard layout, a numeric keypad layout, or another type of keyboard or keypad layout instead). As depicted in FIG. 2, keyboard layout 202 includes a section for upper keys 204 and space key 206. (Throughout this disclosure, "space key" is synonymous with "spacebar".) As depicted in FIG. 2, space key 206 is positioned apart from upper keys 204 such that space key 206 is geometrically lower than upper keys 204.

Touchscreen keyboard layout 202 may be implemented in, by way of non-limiting example, touchscreen 104 of FIG. 1. That is, touchscreen keyboard layout 202 may be displayed on touchscreen 104 of FIG. 1, and the areas demarcated as keys may have the corresponding key function associated with them by processor 106 of the device of FIG. 1.

Figure 3:
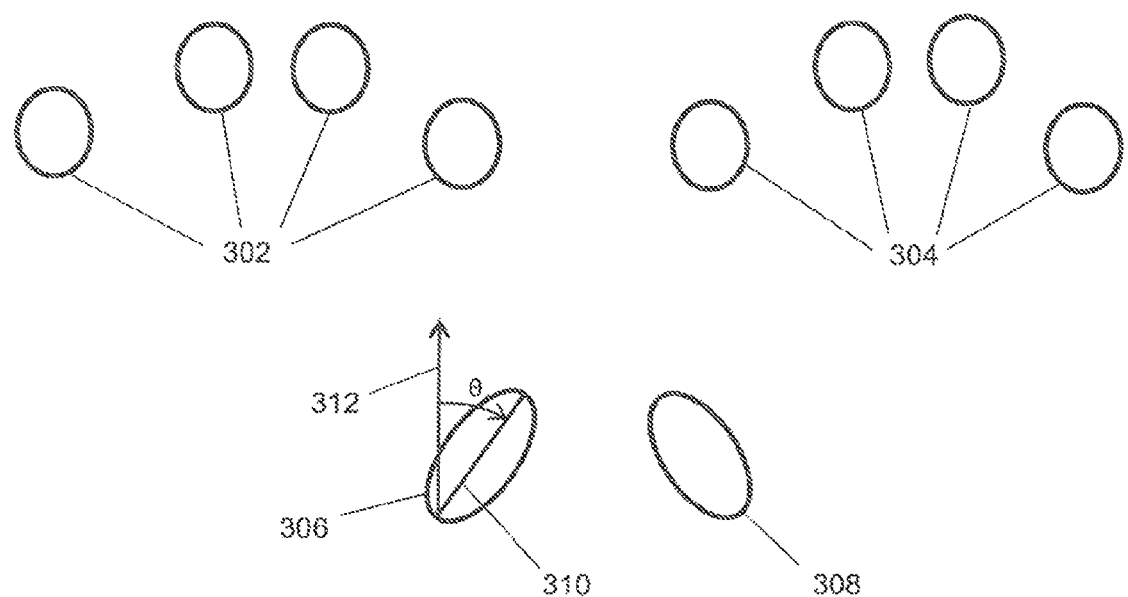
FIG. 3 is a schematic representation of the contacts of a human user's digits when touch typing according to various embodiments.

FIG. 3 is a schematic representation of the contacts of a human user's digits when touch typing according to various embodiments. In particular, when touch typing, a human user is likely to position left-hand fingertip contacts 302 relatively higher than left-hand thumb contact 306. Likewise, right-hand fingertip contacts 304 are typically positioned relatively higher than right-hand thumb contact 308. Each fingertip contact 302, 304 typically occupies less area than thumb contacts 306, 308.

Each finger and thumb contact 302, 304, 306, 308 has an associated diameter, which may be defined as the length of the longest line segment that can be contained in the periphery of the contact. FIG. 3 illustrates the diameter of thumb contact 306 as the longest line segment 310 that can be fit into the periphery of thumb contact 306. Typically, the diameters of thumb contacts 306, 308 are significantly greater than the diameters of finger contacts 302, 304. (Fingertip contacts 302, 304 are typically substantially more circular than thumb contacts 306, 308, which themselves are substantially more oval.)

Each finger and thumb contact 302, 304, 306, 308 has an associated orientation, which may be defined as the angle between an upward-pointing ray and the diameter line segment. Note that the orientation may be defined as ranging from 0° to 180° by restricting the angle measurement to the first and fourth quadrants of the Cartesian plane, or may equivalently be defined as ranging from −90° to +90° by restricting the angle measurement to the first and second quadrants of the Cartesian plane. FIG. 3 illustrates the orientation θ of thumb contact 306. More particularly, FIG. 3 depicts the orientation of thumb contact 306 as the angle θ between diameter 310 and upward-pointing ray 312 as measured in the first quadrant of the Cartesian plane. Typically, the orientation of thumb contacts 306, 308 is consistently different from that of finger contacts 302, 304.

Each contact 302, 304, 306, 308 has an associated texture. The texture includes qualities such as the presence, location and orientation of friction ridges and joint creases. Texture may be determined using, by way of non-limiting example, a high-resolution optical touchscreen. Typically, the texture of thumb contacts 306, 308 is consistently different from that of finger contacts 302, 304. By way of non-limiting example, thumb contacts 306, 308 typically include a joint crease, whereas finger contacts 302, 304 typically do not.

Figure 4:
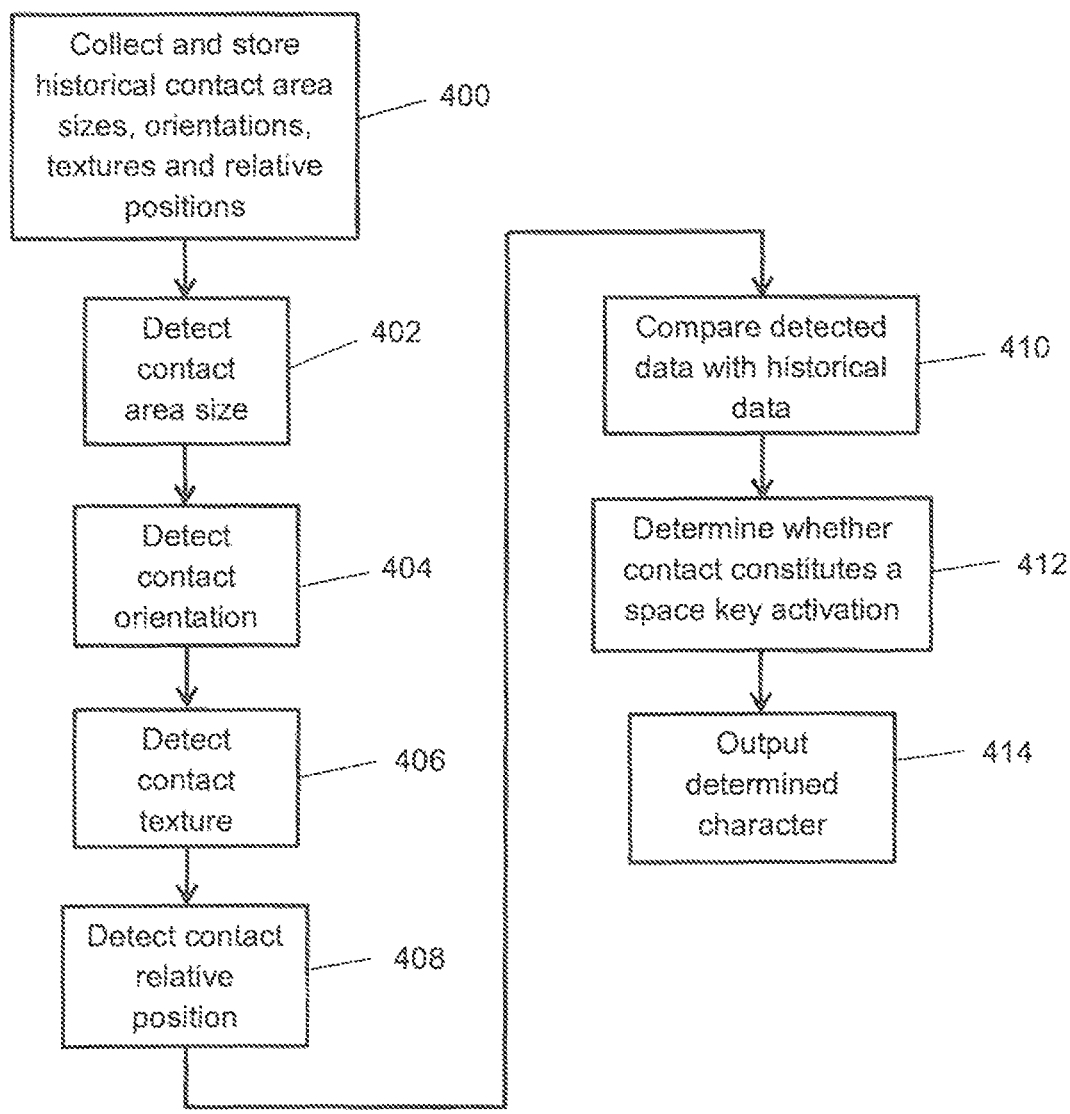
FIG. 4 is a flowchart of a method according to various embodiments.

FIG. 4 is a flowchart of a method according to various embodiments. The method depicted in FIG. 4 may be implemented using, for example, the device discussed above in reference to FIG. 1. The method discussed in reference to FIG. 4 may be user-specific, as different users may be associated with different historical touchscreen contact data and mathematical models based thereon. For example, a user's log-in profile may be associated with, or capture and store, such data. Embodiments may allow a user to opt out of having such individualized data collected and stored.

At block 400, historical touchscreen contact data are collected and stored. The historical touchscreen contact data can include, for a number of finger and thumb contacts, data representing contact area size, contact orientation, contact texture and contact relative position. The number of contacts for which data is collected at this block may be, by way of non-limiting example, 10, 20, 30, 40, 50, 75, 100, 150, 200, 250, 500 or 1000. Specific techniques for detecting and converting the detected contact information into stored values representing contact area size, contact orientation, contact texture and contact relative position are discussed below in reference to blocks 402-408. The historical contact data may be stored in, e.g., persistent memory 108 of device 102 of FIG. 1.

Each datum in the historical contact data may be associated with an identifier as to whether the datum arose from a finger contact or a thumb contact. For example, touchscreen contacts that activate upper keys (those keys 204 of FIG. 2) may be associated with finger contacts, while touchscreen contacts that activate the space key (206 of FIG. 2) may be associated with thumb contacts. (For the calibration phase, only exact activation contacts may be considered; near misses may be excluded.) Thus, each of a plurality of touchscreen contacts may be associated with a finger contact or a thumb contact and the relevant data stored.

The historical touchscreen contact data may be collected during normal user interactions or during a dedicated calibration phase. The dedicated calibration phase, if used, may include displaying a message to a user requesting that the user type some pre-selected text (e.g., "the quick brown fox jumped over the lazy dog"). Alternately, or in addition, the calibration phase may request that the user type random characters or other text.

Blocks 402-414 are directed to detecting and evaluating whether a single touchscreen contact should be interpreted as a space key activation. In what follows, such a single touchscreen contact is referred to as the "possible space key contact."

At block 402, the contact area size of the possible space key contact is detected. The contact area size may be automatically reported by capacitance and other types of touchscreens. Alternately, or in addition, the contact area size may be determined by, for example, calculating a diameter of the contact area, calculating the length of a line segment internal to the contact area that is perpendicular to the diameter, and then using the formula for the area of an ellipse based on major and minor axes of the ellipse. That is, if M is the diameter and m is the length of the perpendicular contained line segment, then the contact area A may be calculated as, by way of non-limiting example, $A = \frac{1}{4}\pi M N$.

At block 404, the contact area orientation is determined. This may be performed by, for example, first determining the diameter, and then determining the relative angle between the diameter and an upward-pointing ray (e.g., 310 and 312 of FIG. 3). The diameter may be determined by first determining the perimeter of the contact area and then fitting the longest contained line segment. Once the diameter is determined, the orientation may then be calculated.

At block 406, the contact texture is determined. The contact texture information may optionally include whether and where a joint crease and/or one or more friction ridges is present in the touchscreen contact, along with any additional characteristics of the same. Biometric automatic fingerprint analytic techniques, known to those of skill in the art, may be employed to convert the detected geometric texture data to numerical quantities for storage.

At block 408, the relative position of the touchscreen contact is detected. This data may include absolute positions on the touchscreen itself relative to a fixed set of x and y-axes. In some embodiments, the centroid of the contact may be determined and recorded.

At block 410, parameters representing the detected touchscreen contact are compared to the stored historical touchscreen contact data. Several different techniques may be used to perform the comparison, as discussed immediately below.

The comparison of block 410 may include or rely on the generation of one or more mathematical models. In general, each contact area size, contact orientation, contact texture and contact relative position included in the stored historical touchscreen contact data may each be considered to be normally distributed for each of two populations: space key contacts and upper key contacts. Accordingly, statistical models (e.g., normal probability distribution functions) may be specified for each population (space key contacts and upper key contacts) for each parameter (contact area size, contact orientation, contact texture and contact relative position). Such models may be generated based on the historical data collected at block 400. Baysean statistics in general, and maximum likelihood estimation (MLE) in particular, may be used to form and test the models. Thus, each parameter and each population may be associated with a probability distribution. MLE may produce the models by, in part, calculating a variance and mean for each population (space key contacts and upper key contacts) and for each parameter (contact area size, contact orientation, contact texture and contact relative position). As known to those of skill in the art, a normal probability distribution function may be determined by a given variance and mean.

At block 410, the parameters for the possible space key contact are compared to the parameters predicted by the mathematical models. In general, for each parameter of the possible space key contact, a probability may be determined as to whether it is a member of the space key contact population, and a related probability may be generated as to whether it is a member of the upper key contact population. Thus, one, two, three or four probabilities (depending on the number of parameters used from among contact area size, contact orientation, contact texture and contact relative position) may be associated with the probable space key contact. These are referred to herein as "parameter probabilities" for the respective populations.

For each population, the parameter probabilities for the possible space key contact may be combined into a single overall score as to whether the possible space key contact is in that population. The overall score for the possible space key contact being in the space key contact population may be achieved by, for example, summing the space key contact parameter probabilities for the possible space key contact. Similarly, the overall score for the possible space key contact being in the upper key contact population may be achieved by, for example, summing the upper key contact parameter probabilities for the possible space key contact. Other techniques for combining the parameter probabilities to achieve overall scores for space key versus upper key contacts are possible (e.g., arithmetic or geometric mean). In some embodiments, a single overall score representing a probability of belonging to one of the populations (space key contacts or upper key contacts) may be generated.

At block 412, based on the overall probability calculated at block 410, the possible space key contact may be classified as belonging to the space key contact population or the upper key contact population. For example, if the overall score for the possible space key contact being in the space key contact population exceeds the overall score for the possible space key contact being in the upper key contact population, then the determination at block 412 may be that the possible space key contact represents a true space key contact attempt. Likewise, if the overall score for the possible space key contact being in the upper key contact population exceeds the overall score for the possible space key contact being in the space key contact population, then the determination at block 412 may be that the possible space key contact does not represent a space key contact attempt.

For embodiments that calculated a single overall score representing a probability of belonging to one of the populations (space key contacts or upper key contacts) the determination of block 412 may include a determination as to whether the single overall score is greater than or less than 50%. The determination of block 412 may be based on that single probability.

At block 414, a space key character is output if the determination at block 412 indicates a true space key contact attempt. This output may be made to a keyboard buffer, or directly to an application that is communicatively coupled to the touchscreen at the time of the possible space key activation. If no true space key contact attempt is determined at block 412, an embodiment may output nothing, or may output the character represented by the nearest non-space key.

Note that a possible space key contact may be considered an actual space key contact attempt even if the contact misses the portion of the touchscreen that is designated as a space key, as long as the possible space key contact is probabilistically more similar to the space key contact population than it is to the upper key contact population as discussed above.

Note that the determination made at block 412 may be combined with the other parameters from the possible space key activation, and the resulting data added to the historical data collected at block 400. In this manner, embodiments may adaptively learn from repeated touchscreen interactions. If the user subsequently deletes the character output at block 414, embodiments may alter the resulting data to reflect the character subsequently typed by the user. For example, if an embodiment outputs a space character at block 414, and if the user subsequently deletes the space character and replaces it with a non-space character, then the data collected in relation to the possible space key contact may be classified as a non-space-key contact for purposes of storage with the historical touchscreen data discussed in reference to block 400. Likewise, if a non-space key character is output at block 414 but then deleted by the user and replaced with a space character, then the associated data may be stored as being in the space key contact population.

While the present disclosure at times discusses embodiments in which the virtual key for which activation attempts are detected is the space key, some embodiments are not so limited. In particular, embodiments may be directed to any virtual key that is intended to be contacted by a thumb (as opposed to fingers), or that is positioned geometrically lower on a virtual keyboard than substantially all of the remaining keys.

The foregoing description is illustrative, and variations in configuration and implementation may occur to persons skilled in the art. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   determining, by a computing device, a location of a thumb contact detected at a touchscreen, wherein the thumb contact detected at the touchscreen is not detected at a region of the touchscreen associated with a virtual space key;
   determining, by the computing device, based at least in part on the location of the thumb contact detected at the touchscreen and one or more parameters associated with the thumb contact, that the thumb contact constitutes an intended activation of the virtual space key; and
   in response to determining that the thumb contact constitutes the intended activation of the virtual space key, outputting, by the computing device and for display, an electronic representation of a space character.

2. The method of claim 1, wherein the one or more parameters associated with the thumb contact comprise one or more of a size of an area of the thumb contact, an orientation of the thumb contact, and a texture of the thumb contact.

3. The method of claim 1, further comprising:
   comparing, by the computing device, the location of the thumb contact and the one or more parameters associated with the thumb contact to data associated with at least one previous contact detected at the touchscreen,
   wherein determining that the thumb contact constitutes the intended activation of the virtual space key further comprises determining, based at least in part on the comparing, that the thumb contact constitutes the intended activation of the virtual space key.

4. The method of claim 1, further comprising:
   assigning, by the computing device, a likelihood score to the location of the thumb contact and each of the one or more parameters associated with the thumb contact,
   wherein determining that the thumb contact constitutes the intended activation of the virtual space key further comprises determining, based at least in part on each of the assigned likelihood scores, that the thumb contact constitutes the intended activation of the virtual space key.

5. The method of claim 1, wherein the one or more parameters associated with the thumb contact comprise a size of an area of the thumb contact, the method further comprising determining the area of the thumb contact using a centroid of the thumb contact and a radius of the thumb contact detected at the touchscreen.

6. The method of claim 1, wherein the one or more parameters associated with the thumb contact comprise an orientation of the thumb contact, the method further comprising determining the orientation of the thumb contact using an orientation of a line segment comprising a maximal diameter of the thumb contact detected at the touchscreen.

7. The method of claim 1, wherein the one or more parameters associated with the thumb contact comprise a texture of the thumb contact detected at the touchscreen, the method further comprising determining the texture of the thumb contact using thumbprint ridges of the thumb contact detected at the touchscreen.

8. A system comprising:
   a touchscreen configured to display a representation of a keyboard; and
   at least one processor configured to:
      determine a location of a thumb contact detected at the touchscreen, wherein the thumb contact detected at the touchscreen is not detected at a region of the touchscreen associated with a virtual space key;
      determine, based at least in part on the location of the thumb contact detected at the touchscreen and one or more parameters associated with the thumb contact, that the thumb contact constitutes an intended activation of the virtual space key; and
      in response to determining that the thumb contact constitutes the intended activation of the virtual space key, output, for display at the touchscreen, an electronic representation of a space character.

9. The system of claim 8, wherein the one or more parameters associated with the thumb contact comprise one or more of a size of an area of the thumb contact, an orientation of the thumb contact, and a texture of the thumb contact.

10. The system of claim 8,
    wherein the at least one processor is further configured to compare the location of the thumb contact and the one or more parameters associated with the thumb contact to data associated with at least one previous contact detected at the touchscreen, and
    wherein the at least one processor is configured to determine that the thumb contact constitutes the intended activation of the virtual space key by at least being configured to determine, based at least in part on the comparing, that the thumb contact constitutes the intended activation of the virtual space key.

11. The system of claim 8,
    wherein the at least one processor is further configured to assign a likelihood score to the location of the thumb contact and each of the one or more parameters associated with the thumb contact, and
    wherein the at least one processor is configured to determine that the thumb contact constitutes the intended activation of the virtual space key by at least being configured to determine, based at least in part on each of the assigned likelihood scores, that the thumb contact constitutes the intended activation of the virtual space key.

12. The system of claim 8,
    wherein the one or more parameters associated with the thumb contact comprise a size of an area of the thumb contact, and
    wherein the at least one processor is further configured to determine the area of the thumb contact by at least being configured to determine the area of the thumb contact using a centroid of the thumb contact and a radius of the thumb contact detected at the touchscreen.

13. The system of claim 8,
    wherein the one or more parameters associated with the thumb contact comprise an orientation of the thumb contact, and
    wherein the at least one processor is further configured to determine the orientation of the thumb contact by at least being configured to determine the orientation of the thumb contact using an orientation of a line segment comprising a maximal diameter of the thumb contact detected at the touchscreen.

14. The system of claim 8,
    wherein the one or more parameters associated with the thumb contact comprise a texture of the thumb contact detected at the touchscreen, and
    wherein the at least one processor is further configured to determine the texture of the thumb contact by at least being configured to determine the texture of the thumb contact using thumbprint ridges of the thumb contact detected at the touchscreen.

15. A non-transitory processor-readable medium storing code representing instructions that, when executed by a processor, cause the processor to:

determine a location of a thumb contact detected at a touchscreen, wherein the thumb contact detected at the touchscreen is not detected at a region of the touchscreen associated with a virtual space key;

determine, based at least in part on the location of the thumb contact detected at the touchscreen and one or more parameters associated with the thumb contact, that the thumb contact constitutes an intended activation of the virtual space key; and in response to determining that the thumb contact constitutes the intended activation of the virtual space key, output, for display, an electronic representation of a space character.

16. The non-transitory processor-readable medium of claim 15, wherein the one or more parameters associated with the thumb contact comprise one or more of a size of an area of the thumb contact, an orientation of the thumb contact, and a texture of the thumb contact.

17. The non-transitory processor-readable medium of claim 15, further comprising instructions that, when executed by the processor, cause the processor to:

compare the location of the thumb contact and the one or more parameters associated with the thumb contact to data associated with at least one previous contact detected at the touchscreen, wherein the instructions that, when executed by the processor, cause the processor to determine that the thumb contact constitutes the intended activation of the virtual space key further comprise instructions that, when executed by the processor, cause the processor to determine, based at least in part on the comparing, that the thumb contact constitutes the intended activation of the virtual space key.

18. The non-transitory processor-readable medium of claim 15, further comprising instructions that, when executed by the processor, cause the processor to:

assign a likelihood score to the location of the thumb contact and each of the one or more parameters associated with the thumb contact, wherein the instructions that, when executed by the processor, cause the processor to determine that the thumb contact constitutes the intended activation of the virtual space key further comprise instructions that, when executed by the processor, cause the processor to determine, based at least in part on each of the assigned likelihood scores, that the thumb contact constitutes the intended activation of the virtual space key.

19. The non-transitory processor-readable medium of claim 15, wherein the one or more parameters associated with the thumb contact comprise a size of an area of the thumb contact, the processor-readable storage medium further comprising instructions that, when executed by the processor, cause the processor to determine the area of the thumb contact using a centroid of the thumb contact and a radius of the thumb contact detected at the touchscreen.

20. The non-transitory processor-readable medium of claim 15, wherein the one or more parameters associated with the thumb contact comprise an orientation of the thumb contact, the processor-readable storage medium further comprising instructions that, when executed by the processor, cause the processor to determine the orientation of the thumb contact using an orientation of a line segment comprising a maximal diameter of the thumb contact detected at the touchscreen.

\* \* \* \* \*